United States Patent [19]

Mori et al.

[11] Patent Number: 4,621,836

[45] Date of Patent: Nov. 11, 1986

[54] MOUNTING CONSTRUCTION OF WEBBING RETRACTOR

[75] Inventors: Shinji Mori; Keiichi Tamura, both of Niwa, Japan

[73] Assignee: Kabushiki Kaisha Tokai-Rika-Denki-Seisakusho, Japan

[21] Appl. No.: 689,786

[22] Filed: Jan. 8, 1985

[30] Foreign Application Priority Data

Jan. 13, 1984 [JP] Japan ............................ 59-3797[U]

[51] Int. Cl.⁴ ...................... A62B 35/00; B60R 21/10
[52] U.S. Cl. ...................................... 280/807; 297/475
[58] Field of Search ............... 280/807, 806, 801, 808; 297/475, 477, 479, 480, 474

[56] References Cited

U.S. PATENT DOCUMENTS

| | | | |
|---|---|---|---|
| 4,387,862 | 6/1983 | Sakurada et al. | 280/807 |
| 4,492,348 | 1/1985 | Ziv et al. | 280/807 |
| 4,519,652 | 5/1985 | Kamijo | 280/807 |

Primary Examiner—Richard A. Bertsch
Attorney, Agent, or Firm—Parkhurst & Oliff

[57] ABSTRACT

In a mounting construction of a webbing retractor on a panel of a vehicle body, one of engaging means of the webbing retractor is latched to one of engaging holes from the back side of the panel and, thereafter, the other of the engaging means is forced into the other of the engaging holes from the front side of the panel.

Accordingly, the webbing retractor can readily be mounted on the panel of the vehicle body without use of such a mounting member as a bolt.

21 Claims, 7 Drawing Figures

MOUNTING CONSTRUCTION OF WEBBING RETRACTOR

BACKGROUND OF THE INVENTION

1. Field of the Invention

The present invention relates to a mounting construction of a webbing retractor retracting an occupant restraining therein, adapted for use in a seatbelt system of a vehicle such as an automobile.

2. Description of the Prior Art

In the mounting construction of the webbing retractor, the webbing is securely screwed to a panel of a vehicle body by use of a bolt, a stay, a space and the like.

Accordingly, even though the webbing retractor is strongly pulled through the webbing in an emergency situation, it remains secured to the panel.

Such a mounting construction is disadvantageous because it takes a long time to manipulate the bolt to mount the webbing retractor to the panel of the vehicle body.

This invention was developed in view of the foregoing background and to overcome the foregoing drawbacks.

SUMMARY OF THE INVENTION

It is accordingly an object of the present invention to provide a mounting construction of a webbing retractor which requires a shortened a time for mounting on a vehicle body.

In the mounting construction of the webbing retractor according to the present invention, a panel of a vehicle body is formed with an opening for receiving the webbing retractor therein and engaging holes positioned on opposite sides of the opening. The webbing retractor is provided with engaging means which engage with the engaging holes. The engaging means of one side is inserted into the opening and it is caused to be latched to the engaging hole of one side from the back side of the panel. The engaging means of the other side is forced into the engaging hole of the other side from the front side of the panel.

Accordingly, the webbing retractor can be mounted readily on the panel of the vehicle body without the use of a mounting member such as a mounting bolt. This results in shortening the mounting time of the webbing retractor.

BRIEF DESCRIPTION OF THE DRAWING

The above and the other objects, features and advantages of the present invention will become more apparent from the following description of the preferred embodiments thereof, taken in conjunction with the accompanying drawings, in which like reference numerals denote like elements, and in which.

The present invention will be described in detail with reference to the accompanying drawings which illustrate a preferred embodiment according to the present invention.

DESCRIPTION OF THE PREFERRED EMBODIMENTS

Figure 1:
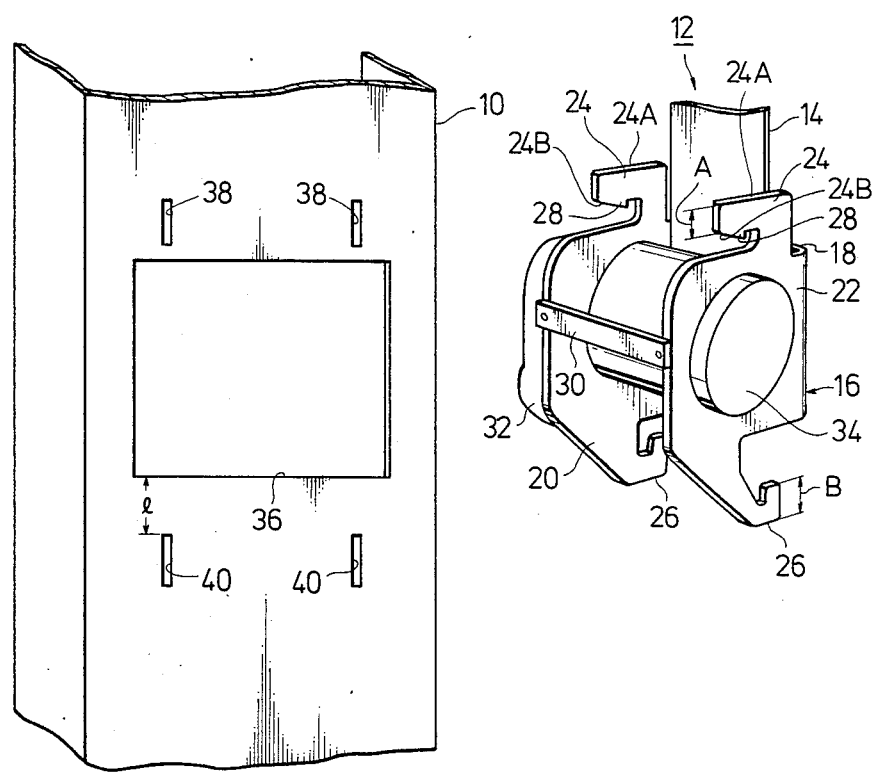
FIG. 1 is a perspective view showing a first embodiment of a mounting construction of a webbing retractor according to the present invention.

As shown in FIG. 1, a webbing retractor 12 is mounted on a portion of a center pillar panel 10 of a vehicle body.

In the webbing retractor 12 one end portion of an occupant restraining webbing 14 is wound up in layers on a webbing takeup shaft (not shown) rotatably supported by a frame 16 of the webbing retractor 12. The frame 16 is press-formed integrally and includes a base portion 18, a pair of leg portions 20 and 22 which extend in parallel with each other from both sides of the base portion 18 at approximately right angles to the base portion 18. Each of the leg portions 20 and 22 is further formed at its upper end portion and its lower end portion with an engaging portion 24 and an engaging portion 26, respectively, as shown in FIG. 1.

The engaging portion 24 is formed substantially in an L shape projectingly from an intermediate portion of the upper end portion of each of the leg portions 20 and 22. The distal portion of the engaging portion 24 is directed in the same direction as the direction of each of the leg portions 20 and 22 and it is formed with an engaging click 28. That is an upper end face 24A of the engaging portion 24 and a face of the base portion 18 cross at right angles, and a lower end face 24B of the engaging portion is inclined to the upper end face 24A, so that the engaging click 28 is formed on the engaging portion 24.

On the other hand, the engaging portion 26 is formed substantially in a J shape, and it has an oblique face inclined to the base portion 18 and the distal portion, contiguous thereto, is directed to the engaging portion 24. Thus, the engaging portions 26 and 24 constitute first and second engaging means, respectively.

The leg portions 20 and 22 are connected to each other by a reinforcement bar 30, and the takeup shaft is rotatably supported by the leg portions 20 and 22. The leg portion 22 is provided with a cover 34 in which a spiral spring is housed for biasing the takeup shaft to wind the webbing 14 on the takeup shaft. Also, the leg portion 20 is provided with another cover 32 in which a webbing locking mechanism is housed for preventing the takeup shaft from its unwinding rotation in an emergency situation of the vehicle.

On the other hand, the center pillar panel 10 is formed with a rectangular opening 36 receiving an intermediate portion of the webbing retractor 12. The center piller panel 10 is also formed at its portions above the rectangular opening 36 with a pair of slits 38 extended vertically and opposed to the respective engaging portions 24, as shown in FIG. 1. Furthermore, the center piller panel 10 is formed at its portions below the rectangular opening 36 with a pair of slits 40 extended in the same manner as the slits 38 and opposed to the engaging portions 26.

The length of each of the slits 38 is approximately the same as the width A of the distal portion of each of the engaging portions 24, and the length of each of the slits 40 is approximately the same as the width B of a side end of the engaging portion 26. In this connection, each of the slits 38 is formed at a nearer portion to the rectangular opening 36 than each of the slits 40.

A mounting of the webbing retractor 12 on the center pillar panel 10 is described below in detail with reference to FIG. 2.

Figure 2A:
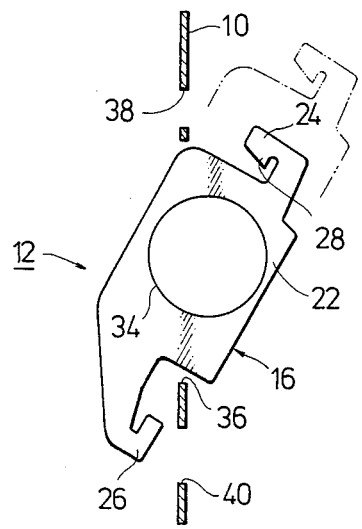
FIGS. 2(A), 2(B), 2(C) and 2(D) are cross-sectional views showing the procedure for mounting the webbing retractor.
Figure 2B:
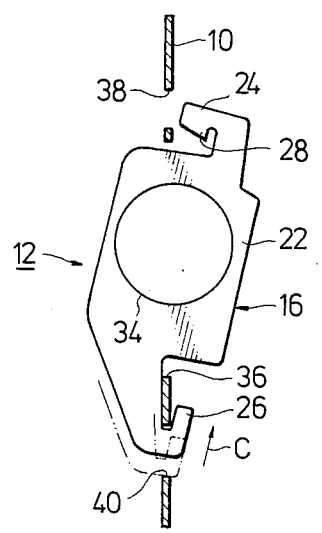
Figure 2C:
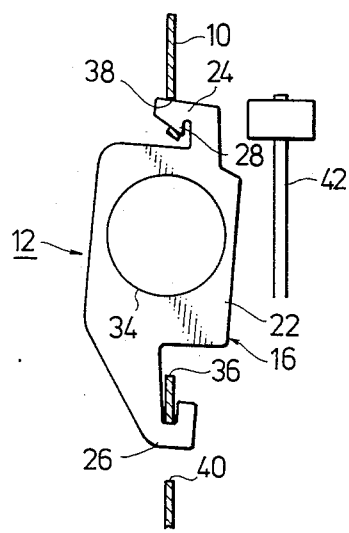

As shown in FIG. 2(A), the webbing retractor 12 is inserted from the side of the engaging portions 26 into the rectangular opening 36, and, as shown in FIG. 2(B), the engaging portions 26 are inserted into the slits 40, thereafter the webbing retractor 12 being lifted up in a direction of arrow C shown in FIG. 2(B), so that the engaging portions 26 are latched to the slits 40. Next, the engaging portions 24 are opposed to the slits 38 and they are hit by a hammer 42 at right angles to the center pillar panel 10, as shown in FIG. 2(C), so that the engaging portions 24 are forced into the slits 38. In this connection, the slits 38 are formed adjacent to the rectangular opening 36 and the engaging clicks 28 are opposed to the side of the rectangular opening 36 positioned on the side of the slits 38, whereby the engaging portions 24 are forced into the slits 38 readily. Thus, the webbing retractor 12 is securely fixed to the center pillar panel 10, as shown in FIG. 2(D).

As set forth above, the mounting of the webbing retractor 12 on the center pillar panel 10 can easily be conducted, which results in shortening of a mounting work of the webbing retractor 12.

Figure 2D:
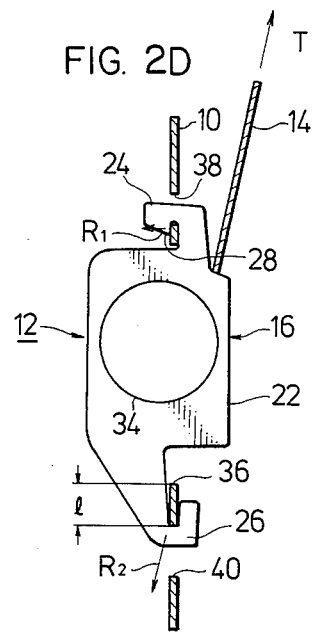

Next, as shown in FIG. 2(D), when the webbing 14 is unwound from the webbing retractor 12 to be worn by an occupant and a tension T acts upon the webbing 14, reaction forces $R_1$ act upon the engaging portions 24 and reaction forces $R_2$ act upon the engaging portions 26, in which $T \approx R_2$ and $|R_1| < < R_2$, when the respective directions of arrows T, $R_1$ and $R_2$ shown in FIG. 2(D) are defined as positive values. The reaction forces $R_1$ are relatively small, which can be made zero or minus value, in which the minus value is better than the zero.

Also, the webbing retractor can surely be latched to the center pillar panel 10 by the engaging clicks 28. On the other hand, the directions of the reaction forces $R_2$ become substantially parallel to a panel force of the center pillar panel 10, but the engaging portions 26 are securely latched to the slits 40 since a distance l between each of the slits 40 and the rectangular opening 36 are sufficiently long as compared with the thickness of the panel.

Figure 3:
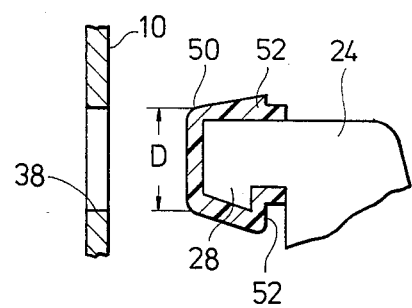
FIG. 3 is a cross-sectional view showing a second embodiment of the present invention.

Referring to FIG. 3, a second embodiment of the present invention is described below.

In the second engaging means, the distal portion of each of the engaging portions 24 is forced with a fastener 50 made from such elastic material as synthetic resin and is covered therewith. The fastener 50 is tapered towards its tip portion and it is formed at its base portion 52 with annular step portion reduced in its diameter. The width D of the tip portion of the fastener 50 is approximately the same as the length of the slit 38. If the fastener 50 is removed from the engaging portion 24, then the distal portion of the engaging portion 24 will be inserted into the slit 38 without resistance. The distal portion of the engaging portion 24 can be inserted into the slit 38 more readily than that of the first embodiment owing to an elasticity of the fastener 50. Also, in the condition that the engaging portion 24 is latched to the slit 38, a contacting area between the base portion 52 and the center pillar panel 10 is much larger than a contacting area between the engaging click 28 and the center pillar panel 10 in the first embodiment, whereby the engaging portion 24 can surely be latched to the slit 38. The second embodiment is the same as the first embodiment except the above points.

Figure 4:
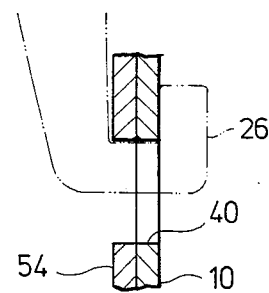
FIG. 4 is a cross-sectional view showing a third embodiment of the present invention.

Referring to FIG. 4, a third embodiment of the present invention is described below.

In the third embodiment, the center pillar panel 10 is fixed at its back face with such a reinforcement member as a panel 54 about the respective slits 40, whereby the mounting portion of the webbing retractor 12 is reinforced.

In this connection, of course, the reinforcement panel 54 can be fixed to only an area of the back face of the center pillar panel 10 between each of the slits 40 and the rectangular opening 36.

In the above embodiments, the frame 16 is press-formed integrally, whereby the number of parts of the webbing retractor 12 can be reduced, which results in reduction of manufacturing costs. Also, the webbing retractor 12 is mounted on the center pillar panel 10 with the webbing retractor 12 received therein up to an intermediate portion of the webbing retractor 12, whereby a projection amount of the webbing retractor 12 from the center pillar panel 10 can be reduced.

In the first embodiment, the distal portion of the engaging portion 26 is directed to the engaging portion 24, but it can be formed in a reverse direction thereto.

In this connection, it is necessary for the rectangular opening 36 to be formed such that the engaging means of one side is inserted thereinto and the engaging means is latched to the engaging slits 40, but the rectangular opening 36 is not required to receive the intermediate portion of the webbing retractor 12 necessarily.

While the preferred embodiment of the present invention has been described, it is to be understood that the invention is not limited thereto, and may be otherwise embodied within the scope of the following claims.

What is claimed is:

1. A structure for mounting a webbing retractor adapted for use in a seatbelt system of a vehicle, comprising:
   (a) an opening for receiving the webbing retractor formed on a panel of a vehicle body;
   (b) a plurality of engaging holes formed in said panel, a first of said plurality of engaging holes formed on a first side of said opening, a second of said plurality of engaging holes formed on a second side of said opening;
   (c) at least one first engaging means provided on the webbing retractor and adapted to be secured to said first engaging hole from a back side of the panel; and
   (d) at least one second engaging means provided on the webbing retractor and adapted to be secured to said second engaging hole from a front side of the panel,
   whereby the webbing retractor can readily be mounted on the vehicle body.

2. The structure for mounting a webbing retractor as set forth in claim 1, wherein the opening is large enough to receive an intermediate portion of the webbing retractor, whereby an amount of projection of the webbing retractor from the panel is reduced when the webbing retractor is mounted on the vehicle body.

3. The structure for mounting a webbing retractor, as set forth in claim 1, wherein the first engaging means is formed substantially in a J shape, whereby, the webbing retractor can be lifted upwardly after the first engaging means is inserted into the opening and secured to said first engaging hole.

4. The structure for mounting a webbing retractor, as set forth in claim 1, wherein the second engaging means is formed substantially in an L shape, whereby, when the second engaging means is opposed to the second engaging hole and a force is applied to said webbing retractor, the second engaging means is forced said second engaging hole.

5. The structure for mounting a webbing retractor, as set forth in claim 1, wherein said plurality of engaging holes comprise parallel slits.

6. The structure for mounting a webbing retractor as set forth in claim 1, wherein the second engaging means is covered with elastic material, whereby the second engaging means is smoothly forced into the second engaging hole.

7. The structure for mounting a webbing retractor, as set forth in claim 1, wherein said at least one first engaging means comprises two engaging means formed on a first pair of parallel leg portions of a frame of the webbing retractor, and wherein said at least one second engaging means comprises two engaging means formed on a second pair of parallel portions of said frame said first and second pair of legs extending in parallel to each other and rotatably supporting therebetween a webbing takeup shaft winding an occupant restraining webbing thereon.

8. The structure for mounting a webbing retractor as set forth in claim 7, wherein the first engaging means comprises substantially J-shaped engaging portions, whereby a distal portion of the J-shaped engaging portion can be secured to the panel at the first engaging hole.

9. The structure for mounting a webbing retractor as set forth in claim 8, wherein the second engaging means comprises substantially L-shaped engaging portions with distal portions of the L-shaped engaging portions extending in the same direction as said leg portions, whereby the second engaging means can be secured to the panel at said second engaging hole.

10. The structure for mounting a webbing retractor as set forth in claim 9, wherein the distal portion of the L-shaped engaging portion is formed with an engaging click which engages with the second engaging hole thereby functioning to prevent said second engaging portion from separating from said second engaging hole.

11. The structure for mounting a webbing retractor as set forth in claim 10, wherein the distal portion of the L-shaped engaging portion is covered with a fastener made of elastic material, whereby the second engaging means is smoothly forced into the engaging hole on the other side.

12. The structure for mounting a webbing retractor as set forth in claim 10, wherein the opening is large enough to receive an intermediate portion of the webbing retractor, whereby an amount of projection of the webbing retractor from the panel is reduced when the webbing retractor is mounted on the vehicle body.

13. The structure for mounting a webbing retractor as set forth in claim 12, wherein the leg portions of the frame are connected by a reinforcement bar, whereby the webbing retractor is reinforced.

14. The structure for mounting a webbing retractor as set forth in claim 13, further comprising a reinforcement member fixed on the panel of the vehicle body at least in an area between the opening and the first engaging hole, whereby the mounting portion of the webbing retractor on the panel of the vehicle body is reinforced.

15. A structure for mounting a webbing retractor for receiving an occupant restraining webbing which is capable of being drawn-out therefrom, adapted for use in a seatbelt system of a vehicle, comprising:
(a) a rectangular opening formed on a panel of a vehicle body;
(b) a first pair of engaging slits formed on the panel on a first side of the opening and a second pair of engaging slits formed on the panel on a second side of said rectangular opening;
(c) a frame of the webbing retractor mounted on the panel and including a pair of parallel leg portions which rotatably support a webbing takeup shaft winding the webbing thereon;
(d) a first engaging portion extending from each of the leg portions, the first engaging portions being inserted into the rectangular opening and being secured to the engaging slits from a back side of the panel, wherein said webbing moves in the direction in which said first engaging portions extend to wind and said webbing moves in an opposite direction to unwind; and
(e) a second engaging portion extending from each of the leg portions, the second engaging portions being forced into the engaging slits on the second side of the rectangular opening from a front side of the panel,
whereby the webbing retractor can readily be mounted on the vehicle body.

16. The structure for mounting a webbing retractor as set forth in claim 15, wherein a distal portion of each of the second engaging portions is covered with a fastener made of synthetic resin, whereby the second engaging portions can be forced smoothly into the second engaging slits.

17. The structure for mounting a webbing retractor as set forth in claim 15, wherein the rectangular opening is large enough to receive an intermediate portion of the webbing retractor, whereby an amount of projection of the webbing retractor from the panel is reduced when the webbing retractor is mounted on the vehicle body.

18. The structure for mounting a webbing retractor as set forth in claim 17, wherein the first engaging portions are formed substantially in a J-shape and distal portions of the J shaped portions correspond to the first engaging slits when the first engaging portions are inserted into the rectangular opening, whereby when the webbing retractor is lifted upwardly, the first engaging portions are latched to the engaging slits on the one side of the rectangular opening.

19. The structure for mounting a webbing retractor as set forth in claim 18, wherein the second engaging portions are formed in substantially on L-shape, and distal portions of the L shaped portions correspond with the second engaging slits on when the first engaging portions are latched to the first engaging slits, whereby when a force is applied to the webbing retractor, the second engaging portions are forced into the second engaging slits.

20. The structure for mounting a webbing retractor as set forth in claim 19, further comprising a reinforcement panel fixed to the panel of the vehicle body at least in an area between the rectangular opening and the first engaging slits, whereby the mounting portion of the webbing retractor on the panel of the vehicle body is reinforced.

21. The structure for mounting a webbing retractor as set forth in claim 20, wherein the leg portions of the frame are connected to each other by a reinforcement bar, whereby the webbing retractor is reinforced.

* * * * *